United States Patent
Griffin

(10) Patent No.: US 10,447,788 B2
(45) Date of Patent: Oct. 15, 2019

(54) COLLABORATION TECHNIQUES BETWEEN PARTIES USING ONE OR MORE COMMUNICATION MODALITIES

(71) Applicant: Cisco Technology, Inc., San Jose, CA (US)

(72) Inventor: Keith Griffin, Oranmore (IE)

(73) Assignee: CISCO TECHNOLOGY, INC., San Jose, CA (US)

( * ) Notice: Subject to any disclaimer, the term of this patent is extended or adjusted under 35 U.S.C. 154(b) by 609 days.

(21) Appl. No.: 14/618,495

(22) Filed: Feb. 10, 2015

(65) Prior Publication Data

US 2016/0234319 A1 Aug. 11, 2016

(51) Int. Cl.
*G06F 15/16* (2006.01)
*H04L 29/08* (2006.01)

(52) U.S. Cl.
CPC .......... *H04L 67/148* (2013.01); *H04L 67/322* (2013.01)

(58) Field of Classification Search
CPC . H04W 76/023; H04W 72/10; H04W 72/042; H04W 72/0446; H04W 8/005; H04W 16/14; H04W 52/243; H04L 47/805; H04L 5/14; H04L 27/2607; H04L 5/0007; H04L 5/0048; H04L 63/101; H04L 67/12
See application file for complete search history.

(56) References Cited

U.S. PATENT DOCUMENTS

| | | | |
|---|---|---|---|
| 6,745,043 B1* | 6/2004 | Lester | H04W 72/10 455/426.1 |
| 7,035,923 B1 | 4/2006 | Yoakum et al. | |
| 8,081,745 B2 | 12/2011 | Burrell et al. | |
| 2010/0332644 A1* | 12/2010 | Corrao | H04L 67/38 709/224 |
| 2011/0119389 A1* | 5/2011 | Cavin | H04L 65/1069 709/228 |
| 2011/0154222 A1* | 6/2011 | Srinivasan | H04L 65/403 715/753 |
| 2013/0079029 A1 | 3/2013 | Levien et al. | |

(Continued)

OTHER PUBLICATIONS

"Method and System for Allowing a User to Switch Communication Mediums," The IP.com Prior Art Database, published Jan. 5, 2012, IP.com disclosure No. IPCOM000213900D, IP.com I, LLC.

*Primary Examiner* — Michael A Keller
*Assistant Examiner* — Thao D Duong
(74) *Attorney, Agent, or Firm* — Polsinelli PC

(57) ABSTRACT

In one embodiment, a collaboration node prioritizes each modality of communication accessible by at least a first user and a second user based on one or more communication characteristics in a collaboration profile, monitors communication characteristics of a communication session conducted in a first modality of communication between the first user and the second user, and determines a second modality of communication accessible to the first user and the second user having a higher priority than the first modality of communication based on the collaboration profile and the communication characteristics for the communication session. The collaboration node further notifies at least one of the first user or the second user when the second modality of communication has the higher priority than the first modality of communication.

16 Claims, 7 Drawing Sheets

(56) References Cited

U.S. PATENT DOCUMENTS

| | | | |
|---|---|---|---|
| 2013/0294595 A1* | 11/2013 | Michaud | H04M 3/42382 379/202.01 |
| 2014/0278977 A1 | 9/2014 | Newton et al. | |
| 2016/0014677 A1* | 1/2016 | Chen | H04W 4/21 455/434 |

* cited by examiner

COLLABORATION TECHNIQUES BETWEEN PARTIES USING ONE OR MORE COMMUNICATION MODALITIES

TECHNICAL FIELD

The present disclosure pertains to communication systems, and more particularly, to improving collaboration amongst parties using one or more communication modalities.

BACKGROUND

Advances in communication technologies provide ever increasing options for communication modalities amongst collaborating parties in addition to traditional modalities of communication (e.g., in-person meetings, telephone calls, etc.). For example, networks such as the Internet provide various digital communication modalities, including email, Voice over Internet Protocol (VoIP), instant messaging, text messaging, online conferencing, video communications, telepresence, and the like.

Often, behavior and etiquette encourage a party in receipt of a communication to respond in like fashion (i.e., using the same modality), despite the availability of other (and sometimes more optimal) modalities of communication. For example, a party in receipt of an email sends a responsive email despite the availability of other modalities of communication such as a phone call, a conference, and even traditional modalities of communication such as an inter-person meeting. In certain instances, such behavior and etiquette results in inefficient communication amongst collaborating parties.

Another example of a resultant inefficient communication includes a hypothetical scenario where two users engage in a messaging session to discuss a topic. According to this hypothetical scenario, one user initiated the messaging session believing the interaction session regarding the topic would be brief. However, the messaging session proved lengthy, with numerous messages, replies, and even included additional related topics. At some point during the interaction, it becomes clear to one or both parties that the messaging modality was not the most efficient modality to discuss the topic.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

A component or a feature that is common to more than one drawing might be indicated with the same reference number in each of the drawings.

DESCRIPTION OF EXAMPLE EMBODIMENTS

Overview

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the term "user" shall be considered to mean a user of an electronic device(s). Actions performed by a user in the context of computer software shall be considered to be actions taken by a user to provide an input to the electronic device(s) to cause the electronic device to perform the steps embodied in computer software. In some instances a user can refer to a user account associated with a particular electronic device.

According to one or more embodiments of the disclosure, a collaboration node (e.g., a node or device, including corresponding hardware and software), prioritizes each modality of communication accessible by at least a first user and a second user in a communication network based on one or more communication characteristics in a collaboration profile. The collaboration node monitors communication characteristics of a communication session conducted in a first modality of communication between the first user and the second user. The collaboration node further determines a second modality of communication accessible to the first user and the second user has a higher priority than the first modality of communication based on the collaboration profile and the communication characteristics for the communication session, and notifies at least one of the first user or the second user when the second modality of communication has the higher priority than the first modality of communication. In certain further embodiments, the collaboration node further transfers and/or merges the communication session conducted in the first modality to (or with) the second modality of communication when the second modality of communication has the higher priority than the first modality of communication.

DESCRIPTION

Figure 1:
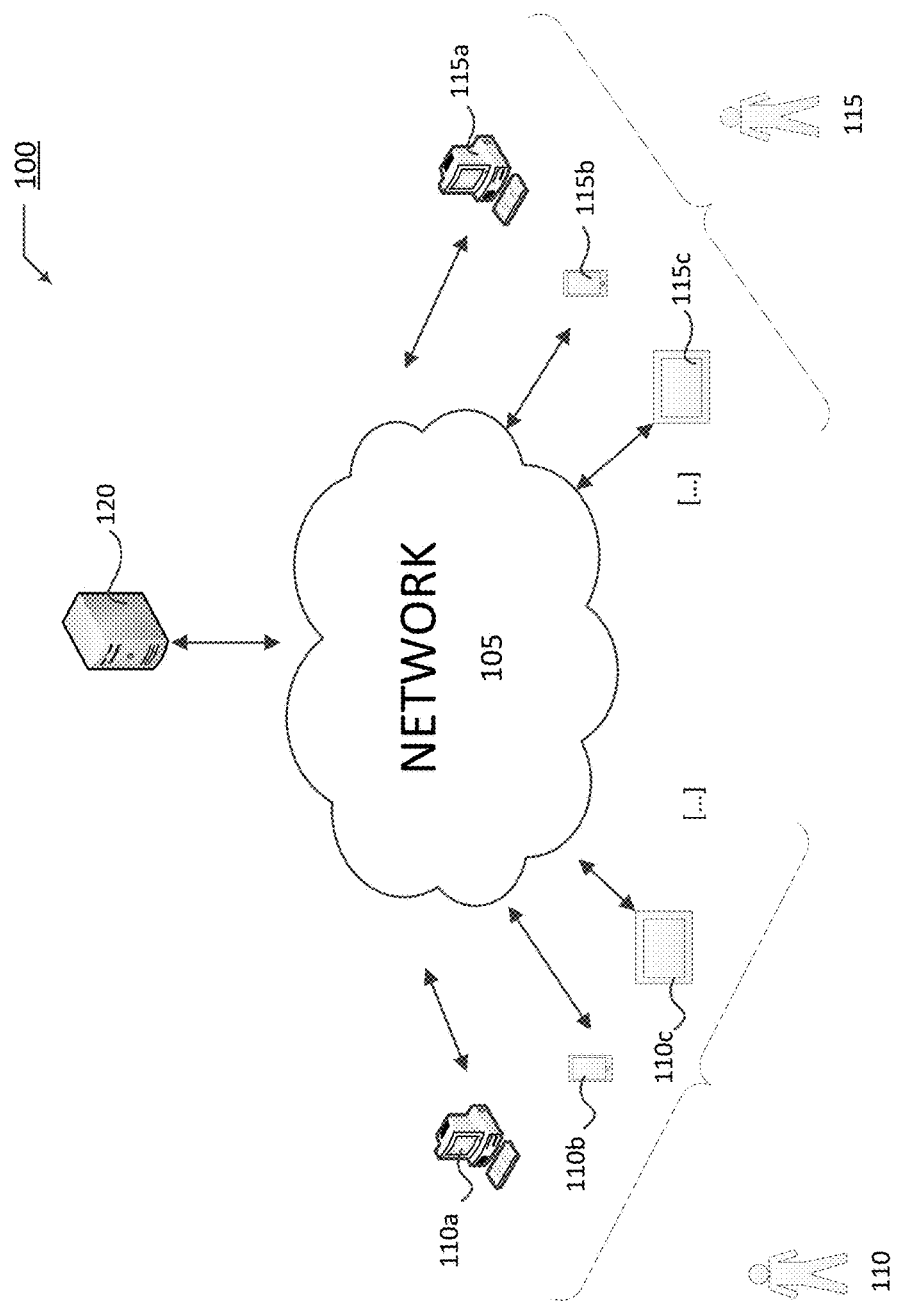
FIG. 1 illustrates an example communication network.

Referring now to the figures, FIG. 1 illustrates a communication environment 100, including a network 105. Network 105 is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Network 105 illustratively includes user nodes/devices 110 associated with a user 110, and nodes/devices 115, associated with a user 115—nodes/device are labeled as shown, "110a", "110b", "110c", and "115a", "115b", "115c", respectively). Network 105 further illustrates a collaboration node/device 120. Each of these nodes/devices are interconnected to a network 105 (e.g., the Internet, etc.) by various methods of communication. For instance, the communication links may be wired links or shared media (e.g., wireless links, PLC links, etc.) where certain devices, such as, e.g., routers, sensors, computers, etc., may be in communication with other nodes devices, e.g., based on distance, signal strength, current operational status, location, etc. Those skilled in the art will understand that any number of nodes, devices, links, etc. may be used in the network 105, and that the view shown herein is for simplicity. Also, those skilled in the art will further understand that while the network 105 is shown in a certain configuration, such view is merely an example illustration that is not meant to limit the disclosure. For example, network 105 can supports WiFi communications, including collaboration and data transfer between users on corresponding mobile devices, phones, computers, etc., according to the collaboration techniques discussed herein.

Figure 2:
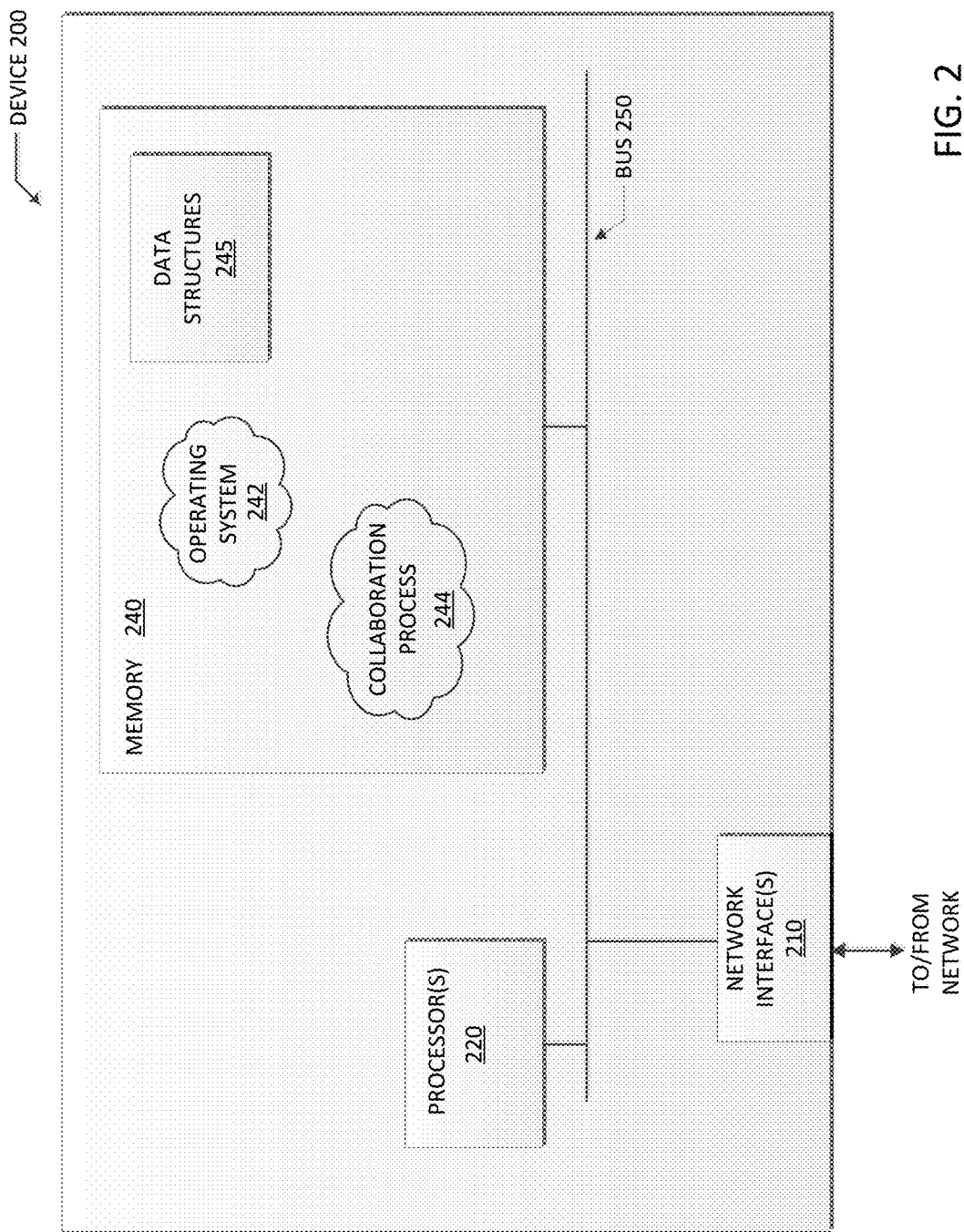
FIG. 2 illustrates an example collaboration device/node.

FIG. 2 is a schematic block diagram of an example node/device 200 that may be used with one or more embodiments described herein, e.g., as the collaboration device 120, or part of a larger distributed collaboration system, shown in FIG. 1 above. The device 200 may comprise one or more network interfaces 210 (e.g., wired, wireless, PLC, etc.), at least one processor 220, and a memory 240 interconnected by a system bus 250.

The network interface(s) 210 contain the mechanical, electrical, and signaling circuitry for communicating data over the communication links coupled to the network 105. The network interfaces may be configured to transmit and/or receive data using a variety of different communication protocols.

The memory 240 comprises a plurality of storage locations that are addressable by the processor 220 and the network interfaces 210 for storing software programs and data structures 245 associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise collaboration process/services 244, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, inefficient communication amongst collaborating parties can result for various reasons—e.g., behavior and etiquette, collaborating parties being generally unaware of each other's proximate geo-location and availability, and the like. For example, as discussed above, responding to a communication in the same modality of communication can result in prolonged and potentially inefficient—i.e., conversations that occur by email can result in numerous and/or a rapid succession of near-real time emails which more resembles the characteristics of a 1:1 or group instant messaging session or even an in-person meeting.

Accordingly, the collaboration techniques disclosed herein monitor a communication session between collaborating parties and identify more efficient ways of collaborating based on the current mode of communication, and also notify or otherwise indicate that additional modalities are available to the collaborating parties. In particular, the collaboration techniques disclosed herein improve collaboration amongst parties by analyzing conversations between two or more users and suggesting enhanced communication options. In some embodiments, for example, the enhanced communication options might allow for more efficient communication, more collaborative communication, better use of resources, etc. Further, collaboration techniques can facilitate transitioning the two or more users to one of the enhanced communication options (e.g., automatically, upon acceptance of a transfer request, etc.).

Figure 3A:
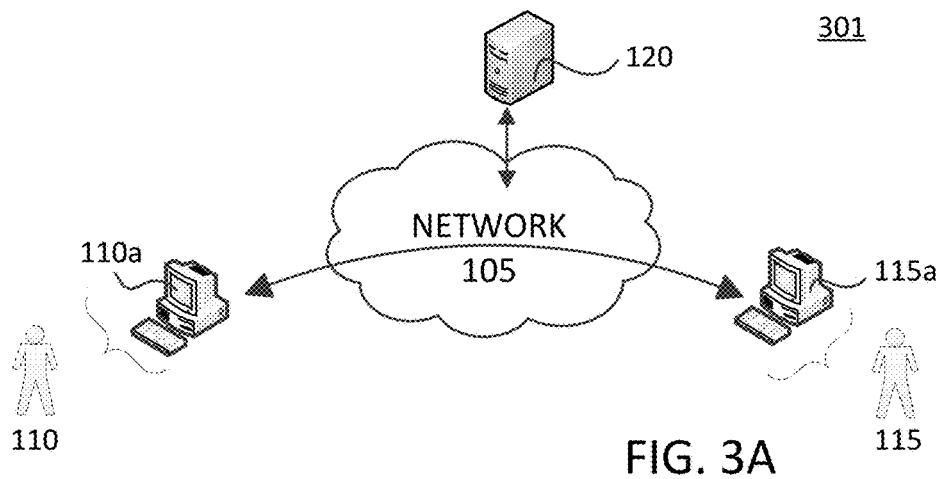
FIGS. 3A, 3B, and 3C collectively illustrate the example collaboration device/node of FIG. 2 managing a communication session between two collaborating users.
Figure 3B:
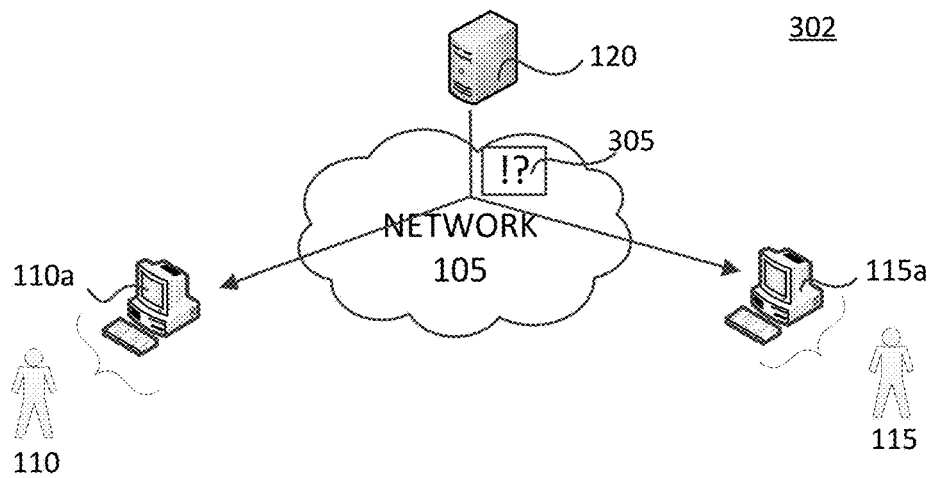
Figure 3C:
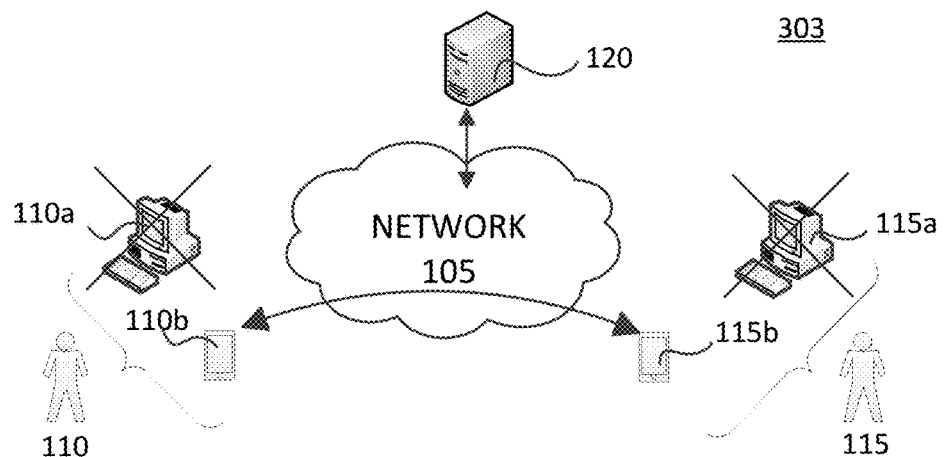

FIGS. 3A, 3B and 3C collectively illustrate one or more of these collaboration techniques according to this disclosure, e.g., the collaboration device 120 executing collaboration process 244.

FIG. 3A illustrates a schematic diagram 301, showing user 110 communicating with user 115 using devices 110a and 115a, respectively (e.g., illustratively shown as computing devices). Collaboration device 120 monitors a communication session between collaborating parties—here, user 110 and user 115. Collaboration device particularly monitors communication characteristics of the communication session for the type or modality of communication. Such communication characteristics can include, for example, a volume of interaction, a frequency of interaction, a duration of interaction, a type of interaction, a number of participants for the interaction, a network resource usage associated with the interaction, a current location of a user, future location of a user, a user preference, presence information for each of the first user and the second user (e.g., location information and calendar information, etc.), a preference list indicating an ordered preference of each modality, etc.

FIG. 3B illustrates a schematic diagram 302, showing collaboration node/module 120 sending one or more notifications 305 to devices 110a and 115a associated with respective users 110 and 115. The one or more notifications 305 indicate a different modality of communication is more suitable (e.g., a second modality of communication) for the communication session—e.g., has a higher priority. For example, collaboration node 120 monitors the communication characteristics of the modality for the communication session described with respect to FIG. 3A, and further determines when a different type or different modality of communication is more suitable for the communication session based, in part, on the communication characteristics. Preferably, the collaboration node 120 monitors the communication characteristics and compares such communication characteristics to a collaboration profile, which prioritizes various modalities of communication accessible to each of the parties to the communication session. The collaboration profile can, for example, include a priority scheme where each type of communication modality accessible by the collaborating parties is prioritized. Further, the collaboration profile can include multiple collaboration profiles defined for various levels—e.g., specific user profiles (e.g., user level preferences), as system level profiles (e.g., default level preferences), and the like. Similar to the communication characteristics, the collaboration profile can prioritize communication modalities according to, for example, a volume of interaction, a frequency of interaction, a duration of interaction, a type of interaction, a number of participants for the interaction, a network resource usage associated with the interaction, a current location of a user, future location of a user, a user preference, presence information for each of the first user and the second user (e.g., location information and calendar information, etc.), a preference list indicating an ordered preference of each modality, heuristic modeling, autonomic modeling, and the like.

FIG. 3C illustrates a schematic diagram 303, showing the communication session transferring to the second or different (e.g., more "suitable") modality of communication— here mobile devices 110b and 110b. In certain embodiments, collaboration device 120 automatically transfers one (or even both) of the users for communication session to the second modality of communication for respective devices. Alternatively, in other embodiments, collaboration device 120 sends a notification indicating the second modality of communication is available/more suitable, and waits to receive a response (e.g., accepting or rejecting the transfer) prior to any transfer. Notably, in certain embodiments, the first modality can be merged or combined with the second or different modality of communication. For example, a communication session first conducted using an email modality can be merged with an instant messaging modality, which can include copying recent correspondence, and the like.

While FIGS. 3A, 3B, and 3C illustrate two users—i.e., user 110 and user 115—and corresponding devices—i.e., devices 110a and 110 b, and 115a and 115b, such views are shown for purposes of discussion and simplicity, not limitation. For example, it is appreciated that any numbers of users can be a part in the communication session and any number of associated devices/modalities of communication can be included. Further, although each user 110 and user 115 are shown as transferring to a different modality of communication on corresponding mobile devices, it is readily appreciated that each user 110 and 115 can be independently transferred to a different modality of communication (e.g., only one is transferred) for a respective device and/or each user 110 and user 115 can transfer to non-corresponding devices that support the different type of modality of communication (e.g., email on a computer and instant message on a mobile device).

Figure 4:
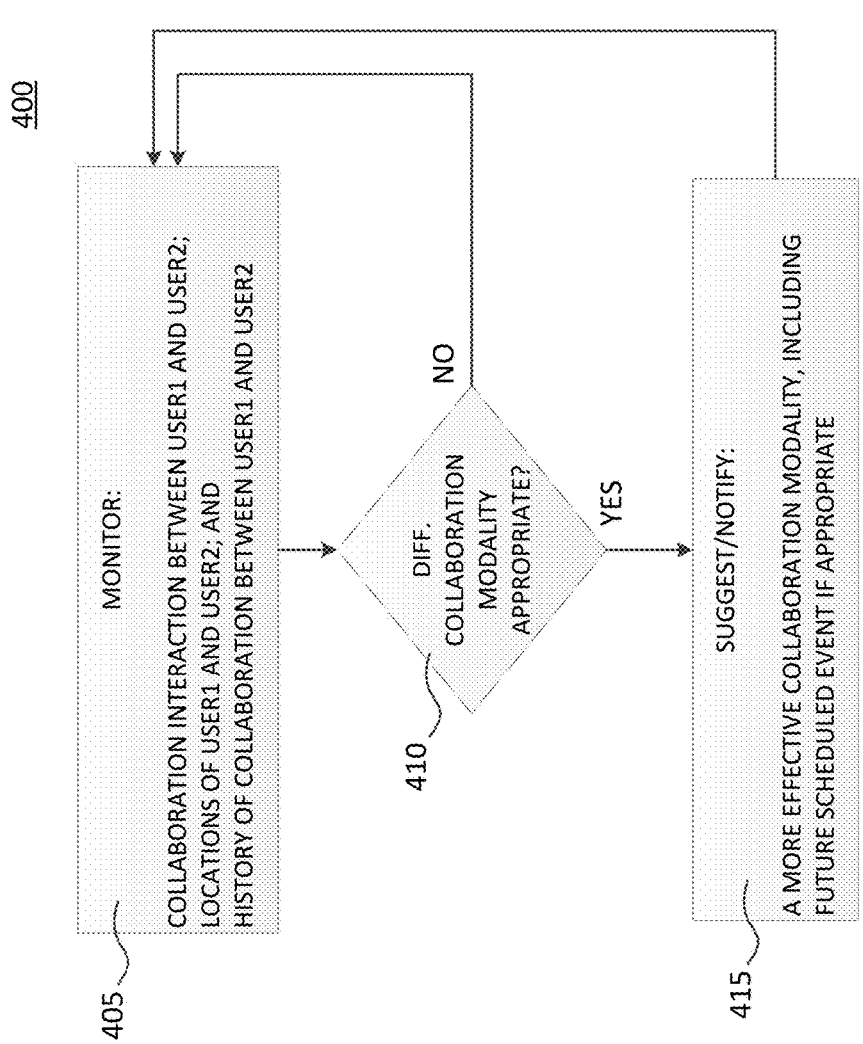
FIG. 4 illustrates an example flow diagram for managing a communication session between collaborating parties.

FIG. 4 illustrates an example flow diagram 400 for managing a communication session between collaborating parties, from the perspective of collaboration device 120, in accordance with the collaboration techniques described herein.

Diagram 400 begins at step 405 where collaboration device 120 monitors a communication session or a "collaboration interaction" between user 1 and user 2, including geo-locations, and a history of interaction between user 1 and user 2.

Next, collaboration device 120 determines if there is a different collaboration modality or communication modality available to the users, which different collaboration modality has a higher priority than the current collaboration modality. As discussed above, the collaboration device 120 can prioritize the collaboration modality according a collaboration profile that accounts for a volume of interaction (e.g., a number of exchanged messages), a frequency of interaction, a duration of interaction, a type of interaction (e.g. real-time or non real-time), a number of participants, a current and future user location for users to the interaction, and the like. Additionally, the collaboration profile can established at system and user levels. System level collaboration profiles can include general best practices, while user level collaboration profiles allow a user control over their own collaboration preferences.

For example, two users may continually instant message on a topic but never talk or have a face-to-face meeting. At a system level, the collaboration device 120, using a collaboration profile, would suggest another more effective collaboration modality based on analysis of the interactions. The collaboration device 120 can also look at fixed location/geo-location and time zone aspects in terms of collaboration modality suggested. As a result, the collaboration device 120 can send a notification suggesting the parties call (e.g., speak) or meet in person as a more effective modality of communication. At a user level, both users may historically instant message, despite the availability of other modalities of communication. One or both users can set a preference for using the instant message modality of communication and/or the collaboration device can iteratively model user behavior when, for example, users reject suggestions to meet in person and instead continue to communicate using instant message communication modalities.

Figure 5:
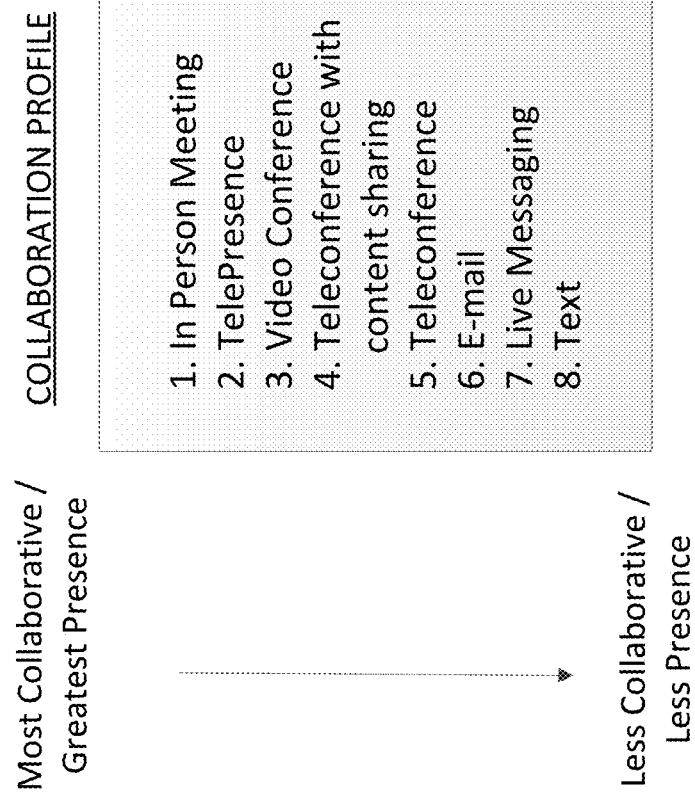
FIG. 5 illustrates an example collaboration profile, showing a priority associated with various modalities of communication accessible by collaborating parties.

FIG. 5 illustrates an example collaboration profile 500, showing a priority associated with various modalities of communication accessible by collaborating parties.

Generally, it can be considered that the most collaborative formats for meetings/discussions are those in which a user has the most presence—whether physical presence, or being mentally present in the sense that a user is focused on the meeting/discussion. As shown by collaboration profile 500, it can be considered that the most collaborative meetings are, in order of most collaborative meeting modalities to the least collaborative modalities of communication: 1. In Person Meeting, 2. TelePresence (e.g., a product of Cisco Technologies, wherein a video call is hosted by a dedicated system in a dedicated meeting room to give a remote user an approximation of appearing in the room, i.e., an approximation of being physically present), 3. Video Conference, 4. Teleconference with content sharing (an online meeting that may allow presentation or even interaction with shared documents or workspaces across the participants of the conference); 5. Teleconference, 6. E-mail, 7. Live Messaging, 8. Text.

It can further be considered that it is more desirable to meet using a communication modality that permits the greatest amount of participant presence and therefore collaboration. As discussed above, two or more users might not always be aware of all meeting collaboration modalities available to them at a given time. Accordingly, the collaboration techniques described herein provide notifications to such users to facilitate more efficient communication sessions.

Examples when one modality of communication may be more suitable over another modality of communication include the above discussed Instant Message modality of communication when the users are in close proximity. In such example, an in-person meeting may be more suitable. Alternatively, if the users are located in disparate geographic locations, but an instant message conversion refers to particular documents, files, and the like, a teleconference with screen sharing capability may be more suitable (i.e., have a higher priority). As another example, a communication session including numerous emails having short messages sent/received within a short time period may result in the collaboration system recommending and/or transferring the communication session to an instant message/phone/teleconference modality of communication.

In other examples, the collaboration system can monitor a high rate of medium duration (~15 min) calls between two users, and suggest that a scheduled online meeting may be a more efficient collaboration type. Similarly, if a user is continually joining immersive collaboration modality (e.g., Jabber, which is a product of CISCO) from a desktop, while additional resources are available to improve the immersive collaboration modality, the collaboration system can suggest the user transfer to such additional resources for a higher quality experience. In certain embodiments, the collaboration system prioritizes modalities of communication based on a higher degree of overall participation for a given set of users. Generally, such prioritization results in more interactive modalities receiving higher priority assignments, however, in certain embodiments, users, as discussed above, may prefer less interactive modalities (i.e., preferring instant messaging or email over in-person meetings). In such embodiments, the collaboration system can prioritize these less interactive modalities of communication over the greater interactive modalities of communication. The collaboration system can, for example, determine a particular user prefers less interactive modalities of communication based on user input, historical preference, and even an amount of user interaction within an interactive environment for a specific modality of communication—i.e., a user only uses a telephone for communication during a WebEx conference when the user can also share video, desktop displays, and the like. In such example, the collaboration system can recommend the users transfer to a point-to-point call and free up network resources. As another example, the collaboration system can determine when a communication modality begins to emulate or imitate behavior of another modality, e.g., two users rapidly sending short emails to each other in quick succession. In this example, the collaboration system can recognize that the rapidly exchanged short emails is more representative of instant messaging behavior, and it may suggest that the users transition to the instant messaging modality to take advantage of other tools available for the instant messaging modality (rather than continue in rapid short emails). In yet another example, the collaboration system can prioritize modalities based on efficient resource usage and/or based on resources available to the users—e.g., an expensive telepresence room is used in a meeting when no other participant has such video capability, resulting in voice conference only collaboration session. In such an example, the collaboration system can determine that a phone call (conference call) modality is preferred, or even a web based conference modality may be a better fit, which can support video capability for other users.

While collaboration profile 500 provides a ordering of the most collaborative meeting channels to least, it will be appreciated to those of ordinary skill in the art that this specific order isn't critical to the present technology. Rather, the key aspect is that for a given meeting, some meeting channels will be more preferred than others, and this preference can be known to the universal communication system. Additionally, as discussed above, in certain embodiments, the collaboration device/system can automatically transfer users to a different or second modality of communication. In other embodiments, the collaboration device/system sends a notification and awaits acceptance or rejection of the suggestion before any transfer.

Moreover, certain embodiments employ autonomic modeling to prioritize types of communication modalities for collaborating parties. As is appreciated by those skilled in the art, autonomic modeling includes self-managing characteristics of distributed computing resources and adapting to unpredictable changes. Using autonomic modeling, the collaboration device/system prioritizes collaboration modalities and transfers users to such modalities based on high-level policies, while iteratively checking and optimizing its priority scheme and adapt to changing environments. Other embodiments employ heuristic modeling to identify an approximate solution when classic methods fail to find any exact solution. This is achieved by trading optimality, completeness, accuracy, or precision for speed.

Figure 6:
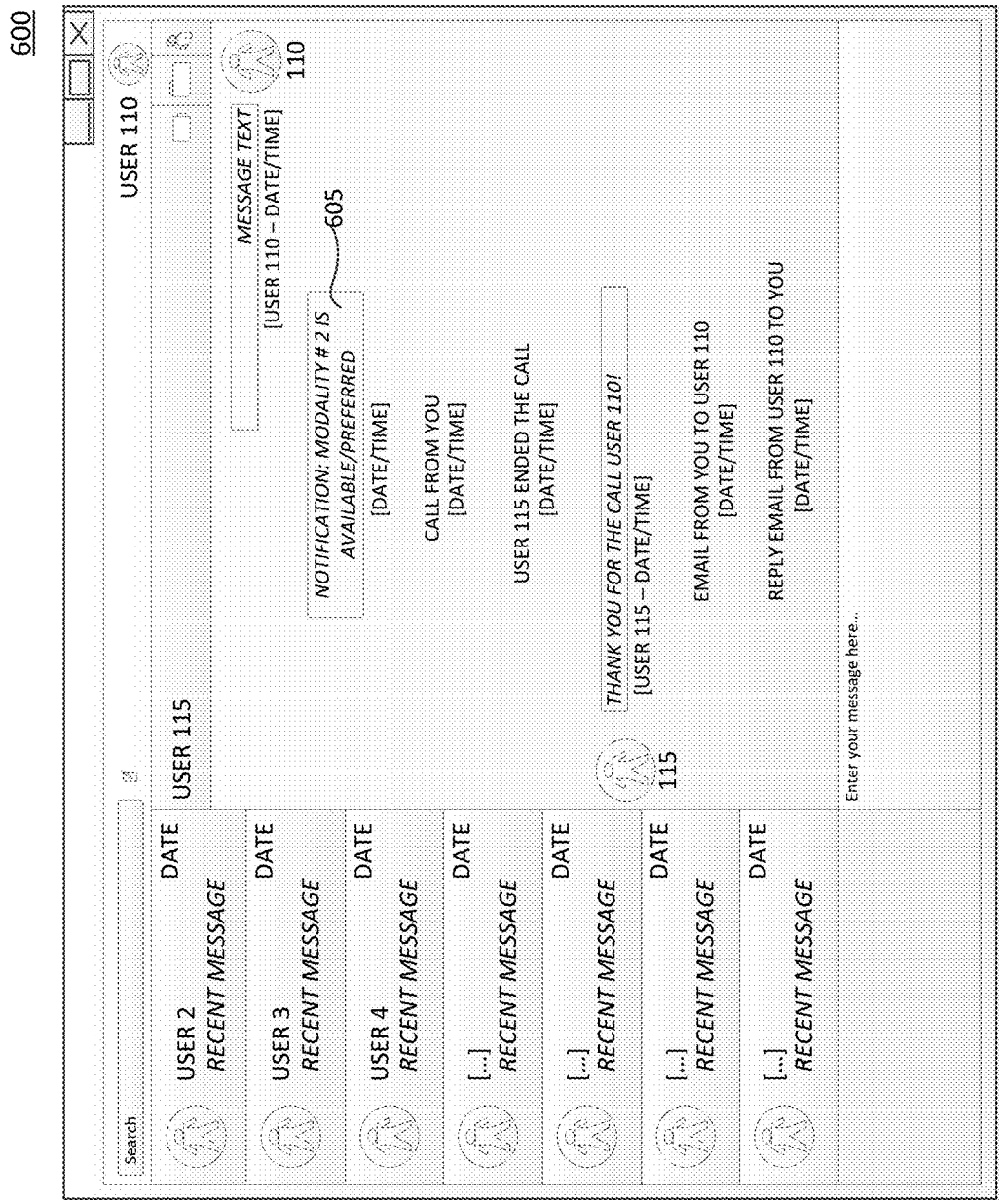
FIG. 6 illustrates an example screen shot of an example communication session between collaborating parties, including notifications to transfer to a different communication modality.

FIG. 6 illustrates an example screen shot 600 of an example communication session between collaborating parties, including notifications to transfer to a different communication modality.

As shown in FIG. 6, two parties—i.e., user 110 and user 115—are communicating using an instant messaging modality of communication. During the exchange of messages between use 110 and user 115, the collaboration device determines that a more suitable modality of communication is accessible to both users (e.g., based on a collaboration profile). The collaboration device sends a notification 605 to one or both users—here, user 110—indicating that "Modality #2 is available and preferred". In response, user 110 and/or user 115 can transfer modalities of communication to modality #2.

Notably, the collaboration system further notifies one or both parties that a transfer to the different or second modality of communication occurred, using the first modality of communication—here, sending an instant message indicating that a call was sent/received and email was sent/received, and the like. In this fashion, users across multiple modalities of communication can track the modality of communication changes for a communication session.

Figure 7:
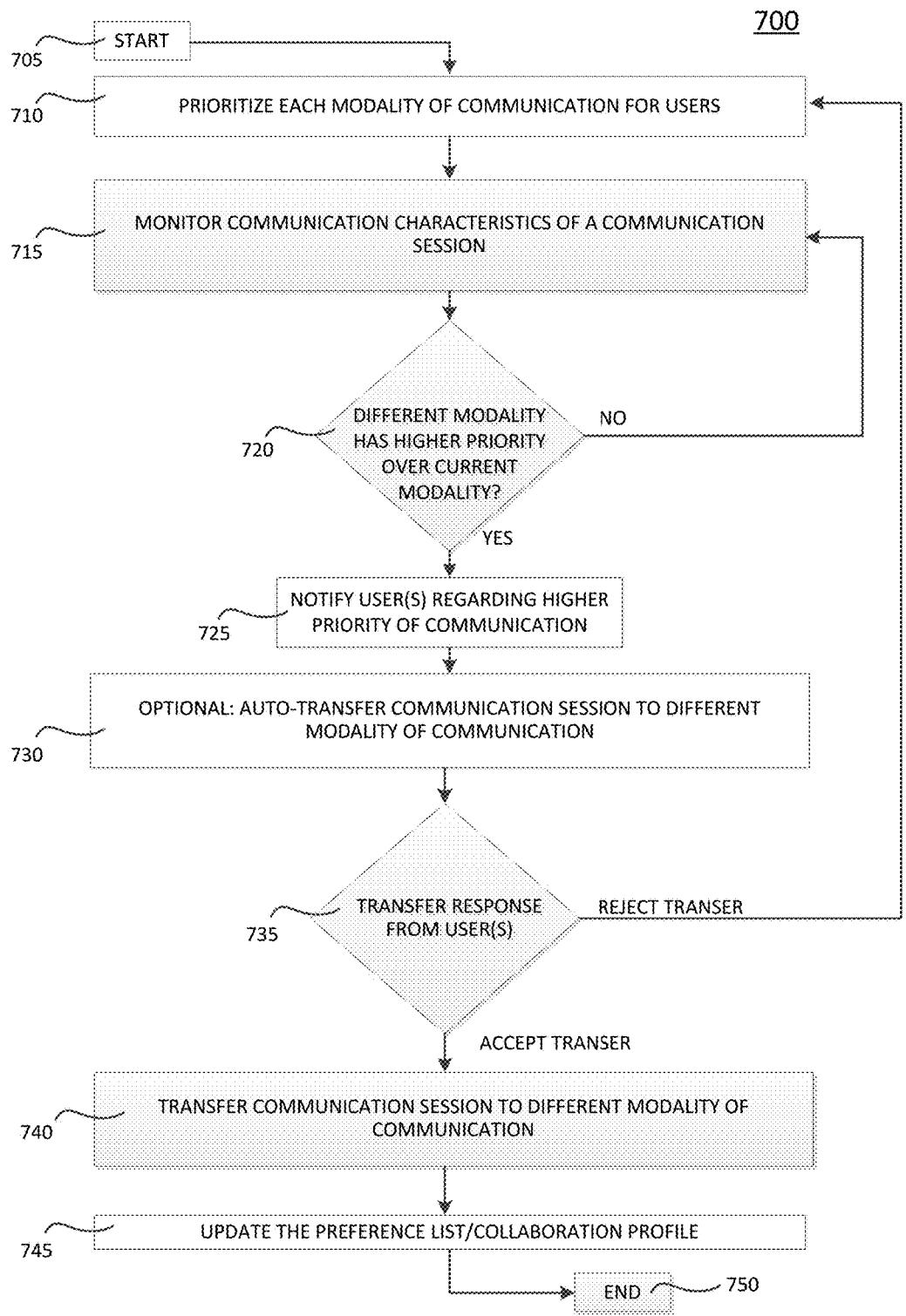
FIG. 7 illustrates an example simplified procedure for managing a communication session between collaborating users.

FIG. 7 illustrates an example simplified procedure 700 for managing a communication session between collaborating users, particularly from the perspective of a collaboration device/system, in accordance one or more embodiments of this disclosure.

Procedure 700 begins at step 705 and continues to step 710, where (as discussed above), a collaboration node (e.g., devices, systems, and the like) prioritizes each modality of communication for users. Typically, the collaboration node prioritizes each modality of communication based on communication characteristics in a collaboration profile. Such characteristics can include, for example, user-level preferences, system level preferences, a volume of interaction between users, a frequency of interaction, a duration of interaction, a type of interaction, a number of participants for the interaction, a network resource usage associated with the interaction, a current location of a user, future location of a user, a user preference, presence information for each of the first user and the second user (e.g., location information and calendar information, etc.), a preference list indicating an ordered preference of each modality, heuristic modeling, autonomic modeling, and the like.

The collaboration node further monitors, in step 715, communication characteristics of a communication session. For example, as discussed above, the monitored communication session between users is typically conducted in a first modality of communication. The collaboration node monitors communication characteristics for the communication session to determine, in step 720, if a different modality has a higher priority than the current modality of communication. If the current modality has the highest priority, the system remains at step 715 where the collaboration node monitors the communication characteristics. However, if the collaboration node determines that a different modality of communication has a higher priority than the current modality, the collaboration node proceeds to step 725, where the collaboration node can notify one or more users of the communication session that the different modality of communication has a higher priority than the current modality of communication. In certain embodiments, the collaboration node transfers, automatically (shown in step 730), the communication session to the different modality of communication. However, in preferred embodiments, the collaboration module waits for a transfer response from one or more users, shown in step 735. The transfer response prompts the collaboration module to return to step 710 and prioritize (e.g., re-prioritize and/or update) the priority for modalities of communication between users) when the transfer response indicates a rejection to transfer, or transfer the communication session to the different modality of communication, when the transfer response indicates acceptance of transfer.

In certain embodiments, as shown here, the collaboration node further prioritizes (or reprioritizes/updates), in step 745, the modalities of communication after transferring the communication session. Procedure subsequently ends in step 750, but may begin again in step 710 where, as discussed above, the collaboration node prioritizes each modality of communication based on one or more communication characteristics in a collaboration profile.

It should be noted that certain steps within procedure 700 may be optional as described above and further, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for managing communication sessions amongst collaborating parties, including monitoring modalities of communication for the communication session, notifying parties to the communication session when certain modalities are more suitable (e.g., based on a prioritization in a collaboration profile), and/or transferring one or more parties to the certain modalities of communication. The collaboration techniques facilitate efficient participation amongst parties and encourages changes in use behavior thereby resulting in shorter more effective communication sessions.

While there have been shown and described illustrative embodiments that provide for collaboration amongst users, it is to be understood that various other adaptations and modifications may be made within the spirit and scope of the embodiments herein. For example, the embodiments have been shown and described herein with relation to two users with associated devices (e.g., computers/tablets/mobile devices, etc.). However, the embodiments in their broader sense are not as limited, and may, in fact, be used with any number of users/devices and the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium, devices, and memories (e.g., disks/CDs/RAM/EEPROM/etc.) having program instructions executing on a computer, hardware, firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   prioritizing, by a collaboration node, each modality of communication accessible by at least a first user and a second user based on one or more communication characteristics in a collaboration profile, the collaboration profile having a default level preference and a user level preference, the one or more communication characteristics including a frequency of interaction between the first user and the second user;

monitoring, by the collaboration node, communication characteristics of a communication session conducted in a first modality of communication between the first user and the second user;

determining, by the collaboration node, a second modality of communication accessible to the first user and the second user having a higher priority than the first modality of communication based on the collaboration profile and the communication characteristics for the communication session;

notifying, by the collaboration node, at least one of the first user or the second user when the second modality of communication has the higher priority than the first modality of communication;

receiving, by the collaboration node, a transfer response from at least one of the first user or the second user in response to the notifying of the at least one of the first user or the second user when the second modality of communication has the higher priority than the first modality of communication, the transfer response indicating at least one of a rejection to transfer or an acceptance to transfer;

transferring or merging, by the collaboration node, the communication session conducted in the first modality to or with the second modality of communication when the second modality of communication has the higher priority than the first modality of communication and the transfer response indicates the acceptance of the transfer; and updating, by the collaboration node, a preference list indicating an ordered preference of each modality of communication accessible by the at least the first user and the second user according to the transfer response.

2. The method of claim 1, wherein the communication characteristics of the communication session include at least one of a volume of interaction, a duration of interaction, a type of interaction, a number of participants for the interaction, a network resource usage associated with the interaction, a current location of a user, future location of a user, or a user preference.

3. The method of claim 1, wherein determining the second modality of communication accessible to the first user and the second user having the higher priority than the first modality of communication further comprises:

determining, by the collaboration node, a priority associated with the first modality of communication for the collaboration profile is lower than a priority associated with the second modality of communication for the collaboration profile.

4. The method of claim 1, wherein prioritizing each modality of communication accessible by at least the first user and the second user based on one or more communication characteristics in the collaboration profile further comprises:

prioritizing, by the collaboration node, each modality of communication accessible by at least the first user and the second user further based on presence information for each of the first user and the second user.

5. The method of claim 4, wherein the presence information includes at least one presence indicia selected from the group consisting of location information and calendar information.

6. The method of claim 1, wherein prioritizing each modality of communication accessible by at least the first user and the second user based on one or more communication characteristics in the collaboration profile, further comprises:

prioritizing, by the collaboration node, each modality of communication accessible by at least the first user and the second user further based on the preference list indicating the ordered preference of each modality of communication accessible by at least the first user and the second user.

7. The method of claim 1, wherein prioritizing each modality of communication accessible by at least the first user and the second user based on one or more communication characteristics in the collaboration profile, further comprises:

prioritizing, by the collaboration node, each modality of communication accessible by at least the first user and the second user further based on at least one of a heuristic model or an autonomic model.

8. The method of claim 1, further comprising:

notifying, by the collaboration node, at least one of the first user or the second user when at least one of the first user or the second user transfers to the second modality of communication using the first modality of communication.

9. A collaboration device comprising:

one or more network interfaces to communicate with in a communication network;

a processor coupled to the network interfaces and adapted to execute one or more processes; and a memory configured to store a process executable by the processor, the process when executed operable to:

prioritize each modality of communication accessible by at least a first user and a second user based on one or more communication characteristics in a collaboration profile, the collaboration profile having a default level preference and a user level preference, the one or more communication characteristics including a frequency of interaction between the first user and the second user;

monitor communication characteristics of a communication session conducted in a first modality of communication between the first user and the second user;

determine a second modality of communication accessible to the first user and the second user having a higher priority than the first modality of communication, based on the collaboration profile and the communication characteristics for the communication session;

generate and send a notification to at least one of the first user or the second user when the second modality of communication has the higher priority than the first modality of communication, the notification based on the second modality of communication determined to have the higher priority than the first modality of communication;

receive a transfer response from at least one of the first user or the second user in response to the notification sent to the at least one of the first user or the second user when the second modality of communication has the higher priority than the first modality of communication, the transfer response indicating at least one of a resection to transfer or an acceptance to transfer; and update a preference list indicating an ordered preference of each modality of communication accessible by the at least the first user and the second user according to the transfer response.

10. The collaboration device of claim 9, wherein the process, when executed, is further operable to:

transfer the communication session conducted in the first modality to the second modality of communication when the second modality of communication has the higher priority than the first modality of communication.

11. The collaboration device of claim 9, wherein the communication characteristics of the communication session include at least one of a volume of interaction, a duration of interaction, a type of interaction, a number of participants for the interaction, a network resource usage associated with the interaction, a current location of a user, future location of a user, or a user preference.

12. The collaboration device of claim 9, wherein the process to determine the second modality of communication accessible to the first user and the second user having the higher priority than the first modality of communication, when executed, is further operable to:
 determine a priority associated with the first modality of communication for the collaboration profile is lower than a priority associated with the second modality of communication for the collaboration profile.

13. The collaboration device of claim 9, wherein the process to prioritize each modality of communication accessible by at least the first user and the second user based on one or more communication characteristics in the collaboration profile, when executed, is further operable to:
 prioritize each modality of communication accessible by at least the first user and the second user further based on presence information for each of the first user and the second user.

14. The collaboration device of claim 13, wherein the presence information includes at least one presence indicia selected from the group consisting of location information and calendar information.

15. The collaboration device of claim 9, wherein the process to prioritize each modality of communication accessible by at least the first user and the second user based on one or more communication characteristics in the collaboration profile, when executed, is further operable to:
 prioritize each modality of communication accessible by at least the first user and the second user further based on the preference list indicating the ordered preference of each modality of communication accessible by at least the first user and the second user.

16. A tangible, non-transitory, computer-readable media having software encoded thereon, the software, when executed by a processor, operable to:
 prioritize each modality of communication accessible by at least a first user and a second user based on one or more communication characteristics in a collaboration profile, the collaboration profile having a default level preference and a user level preference, the one or more communication characteristics including a frequency of interaction between the first user and the second user and/or a volume of interaction between the first user and the second user;
 monitor communication characteristics of a communication session conducted in a first modality of communication between the first user and the second user;
 determine a second modality of communication accessible to the first user and the second user having a higher priority than the first modality of communication, based on the collaboration profile and the communication characteristics for the communication session; and
 notify at least one of the first user or the second user when the second modality of communication has the higher priority than the first modality of communication;
 receive a transfer response from at least one of the first user or the second user in response to notifying the at least one of the first user or the second user when the second modality of communication has the higher priority than the first modality of communication, the transfer response indicating at least one of a rejection to transfer or an acceptance to transfer;
 transfer the communication session conducted in the first modality of communication to the second modality of communication when the second modality of communication has the higher priority than the first modality of communication and the transfer response indicates the acceptance of the transfer; and
 update a preference list indicating an ordered preference of each modality of communication accessible by the at least the first user and the second user according to the transfer response.

* * * * *